United States Patent
Huang et al.

(10) Patent No.: US 8,451,696 B2
(45) Date of Patent: May 28, 2013

(54) TEMPERATURE SENSOR IN A THERMALLY ASSISTED MAGNETIC RECORDING HEAD

(75) Inventors: Fu-Ying Huang, San Jose, CA (US); Lidu Huang, Danville, CA (US); Chie Ching Poon, San Jose, CA (US); Xinjiang Shen, Fremont, CA (US); Barry Cushing Stipe, San Jose, CA (US)

(73) Assignee: HGST Netherlands B.V., San Jose, CA (US)

( * ) Notice: Subject to any disclaimer, the term of this patent is extended or adjusted under 35 U.S.C. 154(b) by 0 days.

(21) Appl. No.: 13/285,769

(22) Filed: Oct. 31, 2011

(65) Prior Publication Data

US 2013/0107390 A1 May 2, 2013

(51) Int. Cl.
*G11B 11/00* (2006.01)
(52) U.S. Cl.
USPC ...................................................... 369/13.02
(58) Field of Classification Search
None
See application file for complete search history.

(56) References Cited

U.S. PATENT DOCUMENTS

| | | |
|---|---|---|
| 5,625,616 A | 4/1997 | Koike et al. |
| 6,671,232 B1 | 12/2003 | Stupp |
| 6,922,383 B2 | 7/2005 | Sakata et al. |
| 7,589,928 B2 | 9/2009 | Roy et al. |
| 7,596,295 B2 | 9/2009 | Hasegawa |
| 7,880,995 B2 | 2/2011 | Lille |
| 2005/0249250 A1 | 11/2005 | Tsai et al. |
| 2005/0265409 A1 | 12/2005 | Tsao et al. |
| 2009/0040645 A1 | 2/2009 | Shimazawa et al. |
| 2009/0225464 A1 | 9/2009 | Juang et al. |
| 2011/0299367 A1* | 12/2011 | Naniwa et al. ............ 369/13.33 |
| 2012/0008230 A1* | 1/2012 | Nishioka et al. ................ 360/59 |
| 2012/0201108 A1* | 8/2012 | Zheng et al. ............... 369/13.26 |

FOREIGN PATENT DOCUMENTS

| | | |
|---|---|---|
| JP | 7182721 | 7/1995 |
| JP | 2002232073 | 8/2002 |
| JP | 2003297029 | 10/2003 |

OTHER PUBLICATIONS

Hu, Shengbin et al., Laser irradiation and its effects on heat transfer in heat assisted magnetic recording, Review of Scientific Instruments, Mar. 27, 2006, American Institute of Physics, Melville, New York, United States.

* cited by examiner

*Primary Examiner* — Adam R Giesy
*Assistant Examiner* — Henok Heyi
(74) *Attorney, Agent, or Firm* — Patterson & Sheridan, LLP

(57) ABSTRACT

A method and apparatus for providing a signal for driving a heating element in a TAR or HAMR enabled disk storage system that includes an optical transducer (or near-field optical source) for further focusing the beamspot of a laser onto a magnetic media, thereby heating the media. The storage system includes a temperature sensor proximate to the near-field transducer which provides a feedback loop to the laser driver to adjust the power of the laser.

18 Claims, 9 Drawing Sheets

TEMPERATURE SENSOR IN A THERMALLY ASSISTED MAGNETIC RECORDING HEAD

BACKGROUND OF THE INVENTION

1. Field of the Invention

Embodiments of the present invention generally relate to data storage systems, and more particularly, to write heads with near-field transducers for thermally assisted recording.

2. Description of the Related Art

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

SUMMARY OF THE INVENTION

The present invention generally relates to TAR enabled heads on disk drives. Specifically, the invention relates to placing a temperature sensor proximate to an optical transducer to control the power of a heating laser.

One embodiment of the invention discloses a head of a magnetic disk that comprises an optical transducer configured to heat a magnetic media proximate to the head and a temperature sensor configured to thermally couple the optical transducer where the temperature sensor and the optical transducer are spaced apart by a first distance.

Another embodiment of the invention discloses a method comprising transmitting optical energy from a laser to an optical transducer located in a head of a disk drive. The method includes measuring the electrical resistance of a temperature sensor that is thermally coupled to the optical transducer where the electrical resistance correlates to a temperature of the sensor and the temperature sensor and the optical transducer are spaced apart by a first distance. The method also includes adjusting the optical energy transmitted by the laser based on the measured electrical resistance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention is generally related to providing a signal for driving a heating element in a TAR or HAMR enabled disk storage system that includes a near-field transducer, or more generally, an optical transducer or near-field optical source for further focusing the beamspot of a laser onto a magnetic media, thereby heating the media. The storage system includes a temperature sensor proximate to the near-field transducer which provides a feedback loop for the laser driver to adjust the power of the laser.

An Exemplary Hard Drive

Figure 1A:
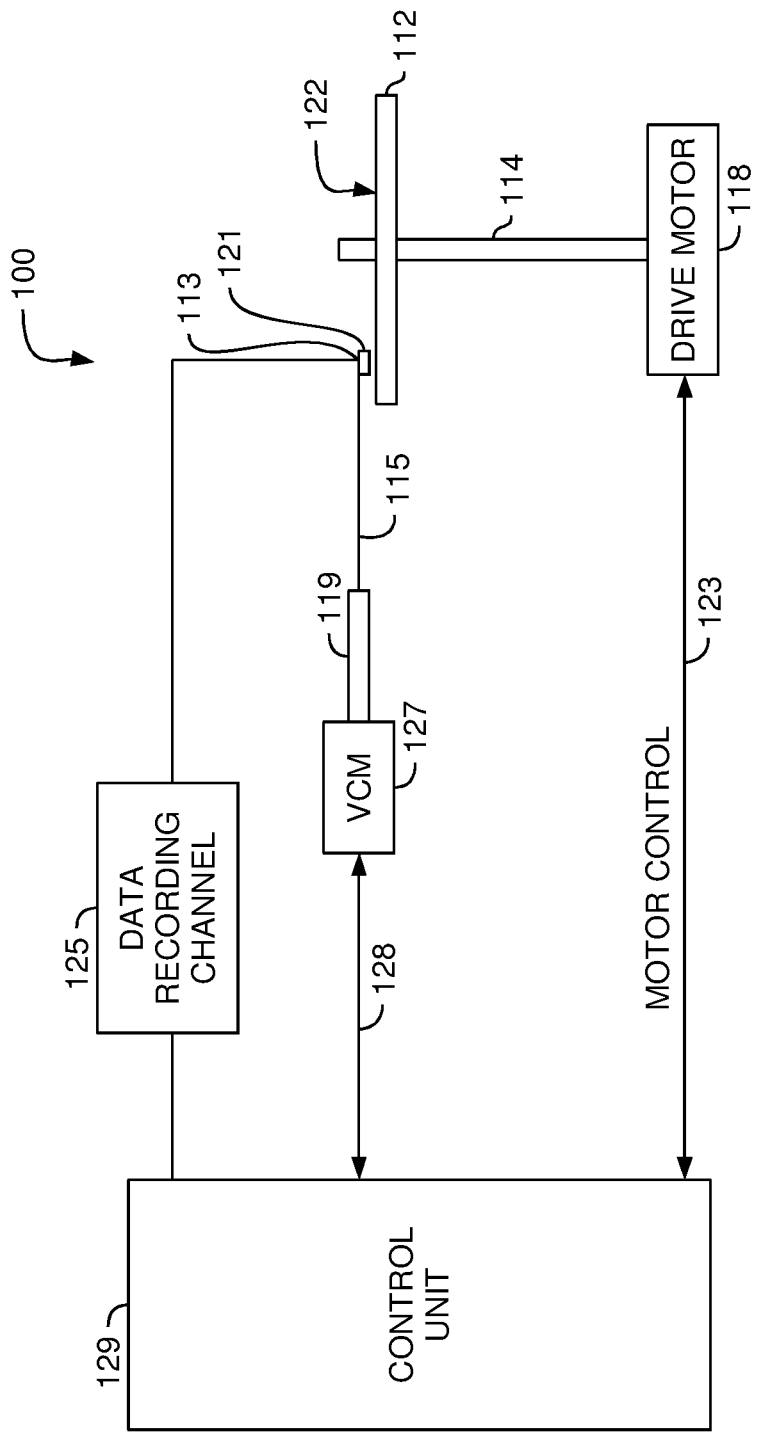
FIGS. 1A-B illustrate a disk drive system, according to embodiments of the invention.

FIG. 1A illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
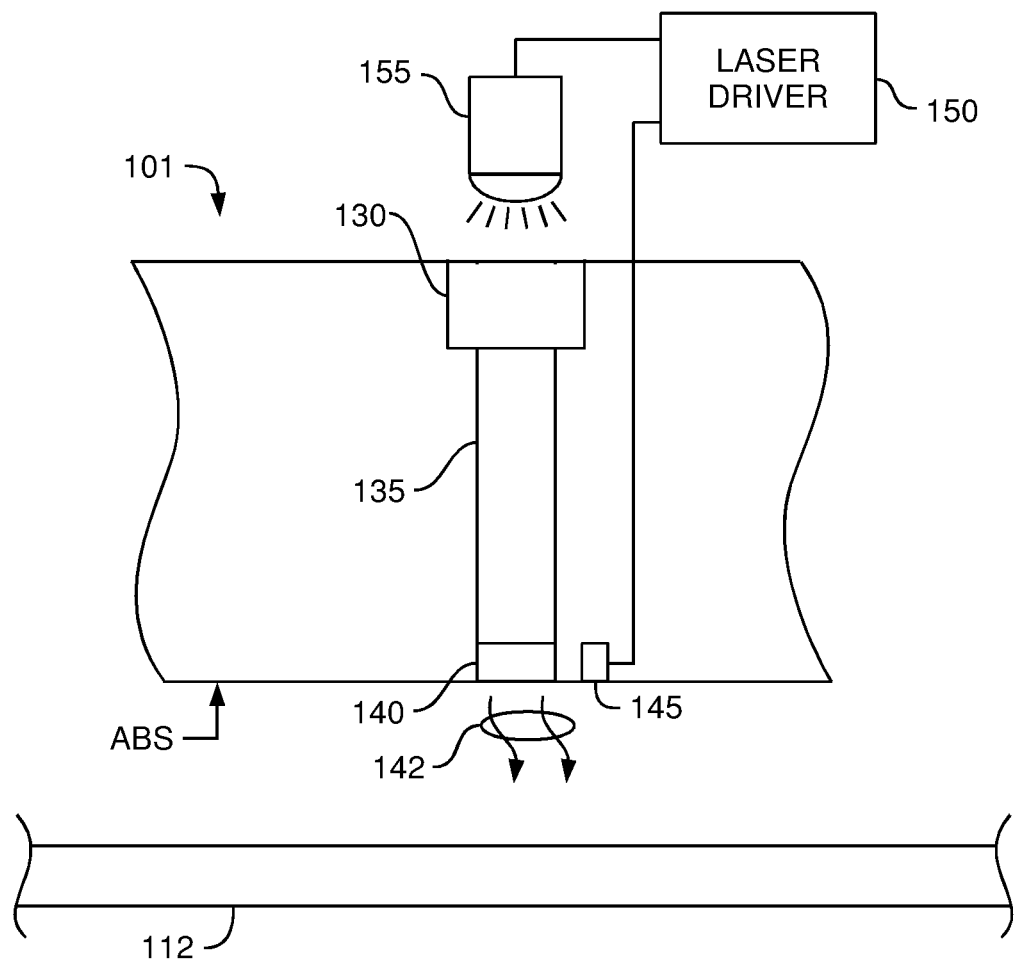

FIG. 1B is a cross sectional schematic of a TAR enabled write head, according to one embodiment of the invention. The head 101 is operatively attached to a laser 155 that is powered by a laser driver 150. The laser 155 may be placed directly on the head 101 or radiation may be delivered from a laser 155 located off the slider through an optical fiber or waveguide. Similarly, the laser driver 150 circuitry may be located on the slider 113 or on a system-on-chip (SOC) associated with the disk drive 100 such as control unit 129. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to the near-field transducer 140—e.g., a plasmonic device—which is located at or near the air-bearing surface (ABS). The near-field transducer 140 further focuses the beamspot to avoid heating neighboring tracks of data on the disk 112—i.e., creates a beamspot much smaller than the diffraction limit. As shown by arrows 142, this optical energy emits from the near-field transducer 140 to the surface of the disk 112 below the ABS of the head 101. The embodiments herein are not limited to any particular type of near-field transducer and may operate with, for example, either a c-aperature, e-antenna plasmonic near-field source, or any other shaped transducer known in the art.

A temperature sensor 145 may be located proximate to the near-field transducer 140. Because the near-field transducer 140 is unable to transfer all of the radiation transmitted by the waveguide 135 to the magnetic media, at least a portion of the optical energy heats the head 101 itself. The temperature sensor 145 may be a thermistor or resistance temperature detector (RTD) where the electrical resistance of the material comprising the sensor 145 changes as the temperature of the material varies (either inversely or directly). The temperature sensor 145 may be electrically coupled to the laser driver 150 or some other control device to measure the electrical resistance of the sensor 145. This change may then be used as a feedback control signal to adjust the power of the laser 155. For example, the laser driver 150 may provide a constant voltage across the temperature sensor 145. If the measured current begins to decrease—e.g., the electrical resistance of the sensor 145 increases—then the laser driver 150 may decrease the power of the laser 155 to decrease the temperature of the temperature sensor 145 and presumably other components of the head 101. This feedback control permits the disk drive 100 to perform TAR at a sufficient temperature without damaging the head 101 by, for example, pole-tip protrusion or metal diffusion of the near-field transducer.

TAR Head with Temperature Sensor

Figure 2:
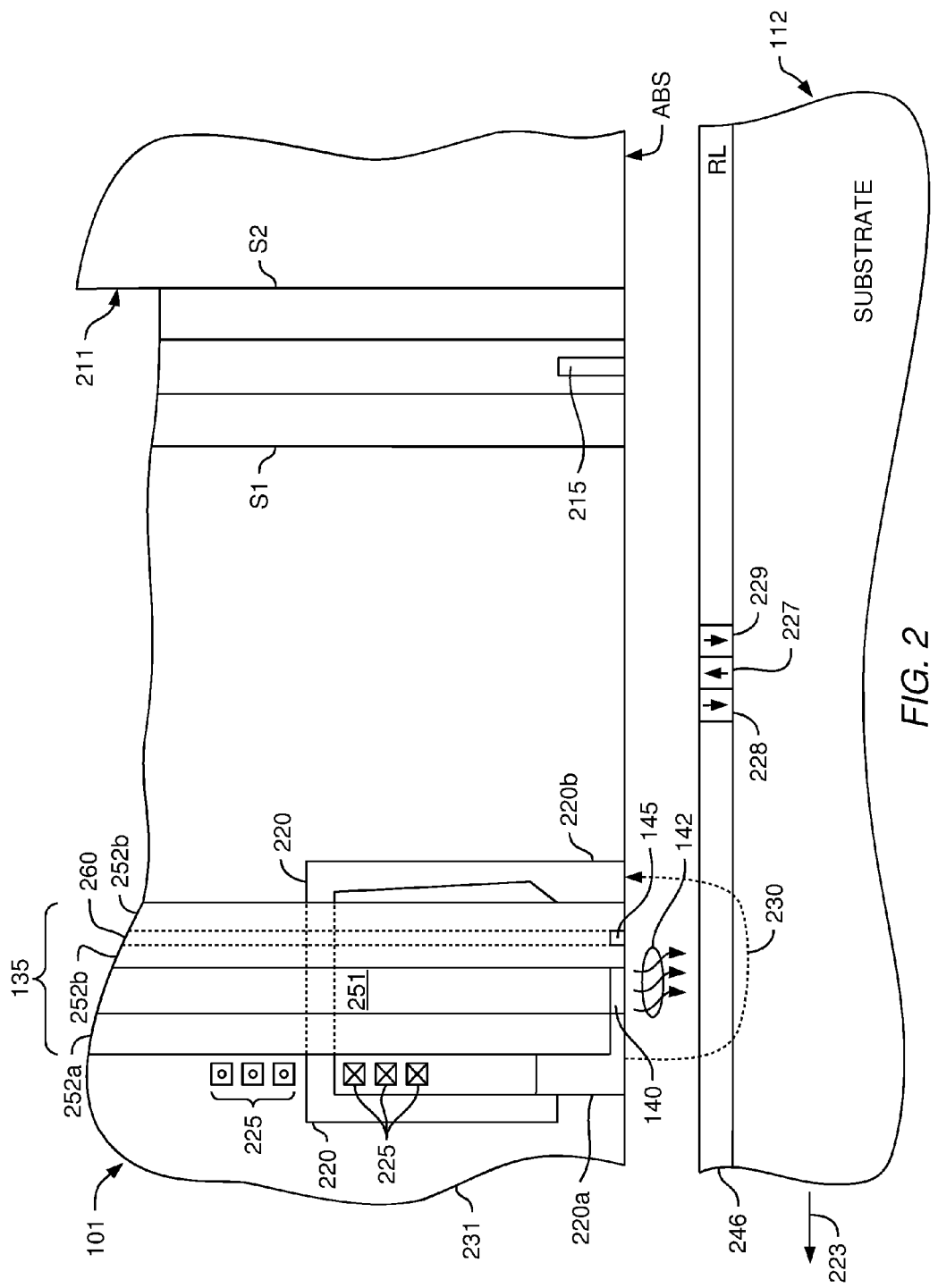
FIG. 2 illustrates a cross-sectional schematic diagram of a TAR enabled head of a disk drive, according to one embodiment of the invention.

FIG. 2 illustrates a cross-sectional schematic diagram of a TAR enabled disk drive, according to one embodiment of the invention. Specifically, FIG. 2 illustrates a portion of an air-bearing head 101 and associated perpendicular magnetic recording disk 112 for a TAR disk drive which uses an optical channel or waveguide 135 for directing heat to the disk. The disk 112 includes a substrate and a perpendicular magnetic recording layer (RL) 246. In one embodiment, the disk 112 may include an optional "soft" or relatively low-coercivity magnetically permeable underlayer (SUL). However, the SUL is not required for a TAR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The disk 112 may also include a protective overcoat (not shown) over the RL 246.

The head 101 has a trailing surface 211 and an ABS surface oriented generally perpendicular to trailing surface 211. The head 101 is typically formed of a composite material, such as a composite of alumina/titanium-carbide ($Al_2O_3$/TiC), and supports the read and write elements which are typically formed as a series of thin films and structures on the trailing surface 211. The disk 112 may spin in a direction 223 away from the trailing surface and towards the other layers of the head 101. The ABS is the recording-layer-facing surface of the slider that faces the disk 112. Note that FIG. 2 is not drawn to scale because of the difficulty in showing the very small features and, for the sake of clarity, omits structures from the head such as spacing and insulating layers.

The head 101 includes a conventional magnetoresistive read pole 215 located between shields S1 and S2, and a conventional perpendicular write head that includes a magnetic yoke 220 with a write pole 220a, a return pole 220b, and an electrically conductive coil 225. The write pole 220a is formed of conventional high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the invention is not limited to the structure and material discussed above. For example, the coil 225 may be a helical coil or the write pole 220a may include a wrap-around shield. Further, the present invention may operate with any recording head that can perform the functions discussed herein.

The head 101 may also include a waveguide 135 with a near-field transducer 140 near or at the ABS. As shown, the waveguide 135 and near-field transducer 140 extend through the yoke 220 and are located between the write pole 220a and the return pole 220b. As noted by the ghosted lines, the yoke 220 may continuously connect the write pole 220a to the return pole 220b. The waveguide 135 and near-field transducer 140 may be fabricated at any location such that the near-field transducer 140 passes over a portion of the spinning magnetic disk 112 prior to that portion passing below the write pole 220a. Specifically, the waveguide 135 may be located between shield S2 and return pole 220b, or between the write pole 220b and the outer face 231 of the head 101 (if the disk 112 rotates opposite of the direction 223 shown).

While writing to the disk 112, the RL 246 moves relative to the head 101 in the direction shown by arrow 223. In TAR, the optical energy 142 emitted from the transducer 140 temporarily lowers the coercivity ($H_c$) of the RL 246 so that the magnetic recording regions 227, 228, 229 may be oriented by the write field from write pole 220a. The magnetic recording regions 227, 228, 229 become oriented by the write field if the write field ($H_w$) is greater than H. After a region of the RL 246 in the data track has been exposed to $H_w$ from the write pole 220a and the resulting heat from the optical energy 142 from the near-field transducer 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the near-field transducer 140 uses the optical energy 142 to heat the RL layer 246 and lower its magnetic coercivity.

The waveguide 135 is formed of a core material 251 such as a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The radiation-transmissive core material 251 is surrounded by a cladding material 252a,b that has a lower refractive index than the core material 251 and is transmissive to radiation at the wavelength of the laser radiation source—e.g., laser 155. Typical cladding materials include $SiO_2$ and $Al_2O_3$.

The head 101 may also include a temperature sensor 145 proximate to the near-field transducer 140. The temperature sensor 145 measures the heat that may emanate from the transducer 140 that does not transfer into the magnetic disk 112. In one embodiment, because the head temperature is proportional to the laser power, the temperature sensor 145 may be used to maintain a constant laser power. Alternatively or additionally, the temperature sensor 145 may also be used to protect the head 101 from damage. In some instances, the heat transferred from the transducer 140 to the head 101 may be significant enough to interfere with the normal read/write functions of the head 101 or damage the head 101. The temperature sensor 145 may be connected to at least one wire pad 260 that provides an electrical connection to a connector pad (not shown) located at the top of the head 101—i.e., the side opposite the ABS. From there, a wire may electrically connect the temperature sensor 145 to the laser driver 150 as shown in FIG. 1B.

In one embodiment, the temperature sensor 145 is embedded in cladding 252a or 252b. In another embodiment, the sensor 145 and wire pad 260 may both be embedded in either cladding 252a or 252b. Alternatively, the sensor 145 and wire pad 260 may be located between cladding 252b and the write pole 220a or between cladding 252a and the return pole 220b.

In one embodiment, the temperature sensor 145 and wire pad 260 are surrounded by a non-magnetic and insulative material. In one embodiment, the sensor 145 may not be located in any cladding 252 but may be embedded in a separate non-magnetic and insulative material that is located between the waveguide 135 and the return pole 220b.

In one embodiment, the temperature sensor 145 may be located outside of the boundaries of the yoke 220. For example, the temperature sensor may be between the return pole 220b and the shield S1 or to the left of the write pole 220a—i.e., a side of the write pole 220a that is opposite of the side facing the read pole 215 faces the temperature sensor 145.

Figure 3:
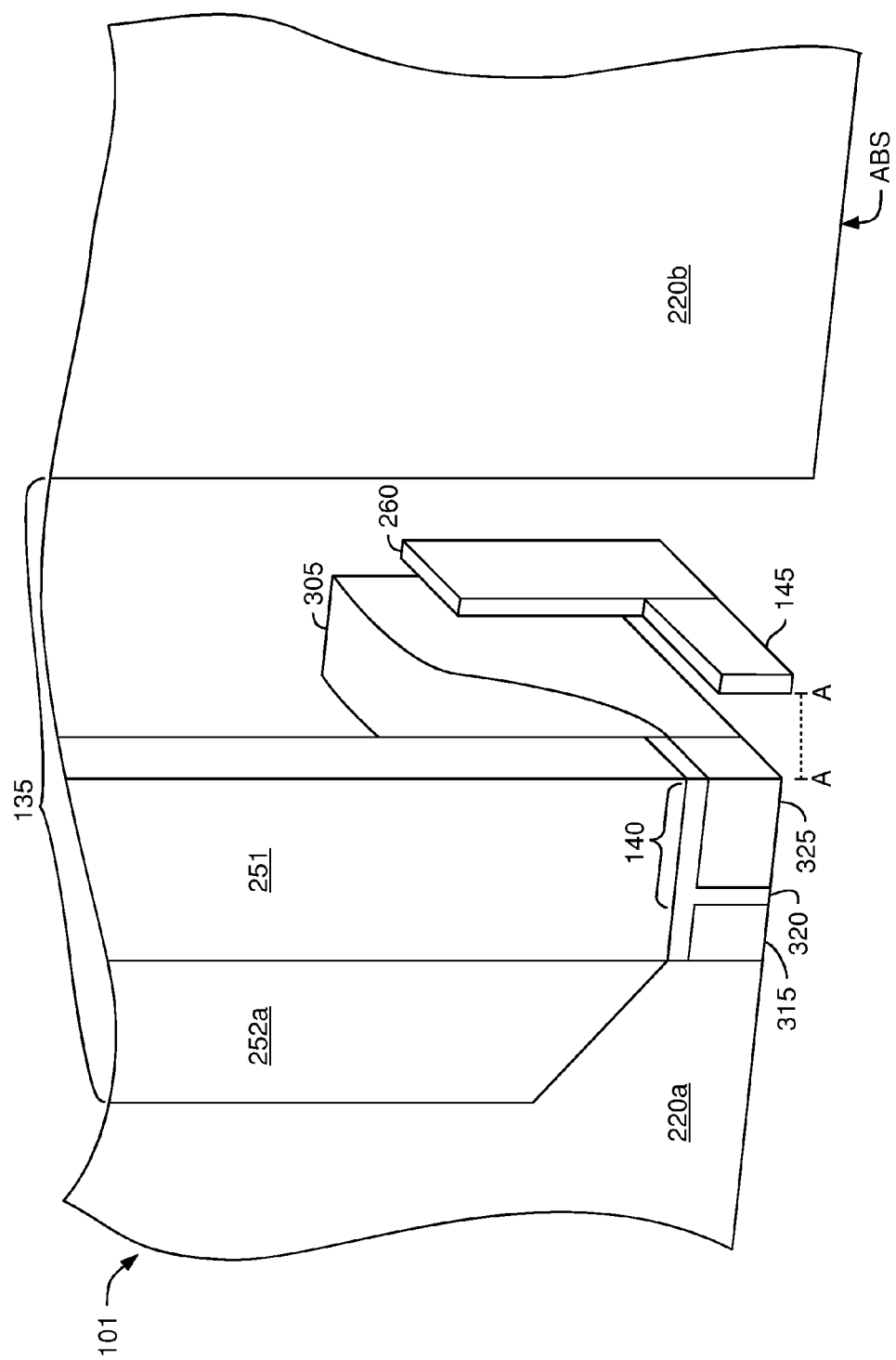
FIG. 3 illustrates a cross-sectional schematic diagram of a TAR enabled head, according to one embodiment of the invention.

FIG. 3 illustrates a cross-sectional schematic diagram of a TAR enabled head, according to one embodiment of the invention. As shown, this portion of the head 101 includes the waveguide 135 but with cladding 252b (and any cladding on the back-side of the head 101) removed to better illustrate the details of the temperature sensor 145, wire pad 260, and heat sink 305. The near-field transducer 140 may be directly or thermally coupled to the heat sink 305 for removing excess heat from the transducer 140. Because FIG. 3 is a cross-section of head 101, there may be another heat sink located opposite the heat sink 305 depicted. The return pole 220b is shown between the temperature sensor 145 and the shield layers S1, S2 or read pole 215 (not shown).

In one embodiment, the electrical resistance of the temperature sensor 145 changes according to its temperature. For example, depending on the material chosen, the electrical resistance of the sensor 145 may increase as its temperature decreases. Or the electrical resistance may increase when its temperature increases. Suitable materials for the temperatures sensor 145 include Ta, Pt, Au, Rh, NiFe, or alloys thereof. In one embodiment, a constant voltage (or a constant current) may be applied across the sensor. The resulting current can be plotted according to time to determine changes in the resistance of the temperature sensor 145. This change may be used to increase or decrease the radiation emitted from the laser 155.

In one embodiment, to electrically connect the temperature sensor 145 to a monitoring circuit (e.g., laser driver 150) the head 101 may have wire pads 260 connected to opposite sides of the temperature sensor 145. For clarity, in FIG. 3 the wire pad located opposite the wire pad 260 is omitted. In one embodiment, the electrical resistance of the material comprising the wire pad 260 is less dependent on temperature than the material used for the temperature sensor 145. That is, the electrical resistance of the wire pad 260 is less sensitive to temperature fluctuations than the temperature sensor 145. In one embodiment, the wire pads 260 may comprise Ru. However, in one embodiment, the material of the wire pad 260 may be the same as the material used for the temperature sensor 145.

Although not shown in FIG. 3, the wire pad 260 may extend away from the ABS until it reaches a connector pad located at the top of the head 101. The pads 260 may flare or widen and include Cu or Ta leads.

The core 251 may terminate at the near-field transducer 140. The transducer 140 at least includes an antenna 325 and dielectric 320. In one embodiment, the transducer may also include a pole lip 315. The antenna 325 may be Cu, Au, Ag, or alloys thereof. The dielectric 320 is an aperture or opening that may be filled with radiation-transmissive material such as $SiO_2$ or other dielectric material. In one embodiment, the dielectric 320 may comprise of the same material as the cladding 252. The pole lip 315 may comprise of Ni, Co, Fe, or some combination or alloy thereof. The structure of the transducer 140 may be similar to the near-field optical source discussed in a US Pat. App. 2010/0163521 Balamane et al. which is herein incorporated by reference. The transducer 140 uses the antenna 325 and dielectric 320 to further focus the beamspot onto the magnetic media 112.

Figure 4A:
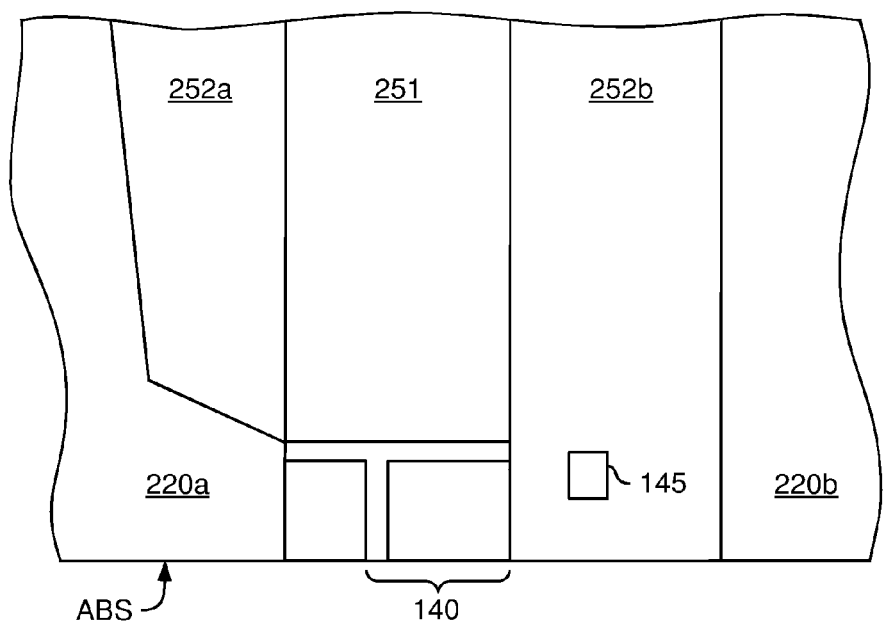
FIGS. 4A-B illustrate a cross-sectional schematic diagram of a TAR enabled head, according to embodiments of the invention.
Figure 4B:
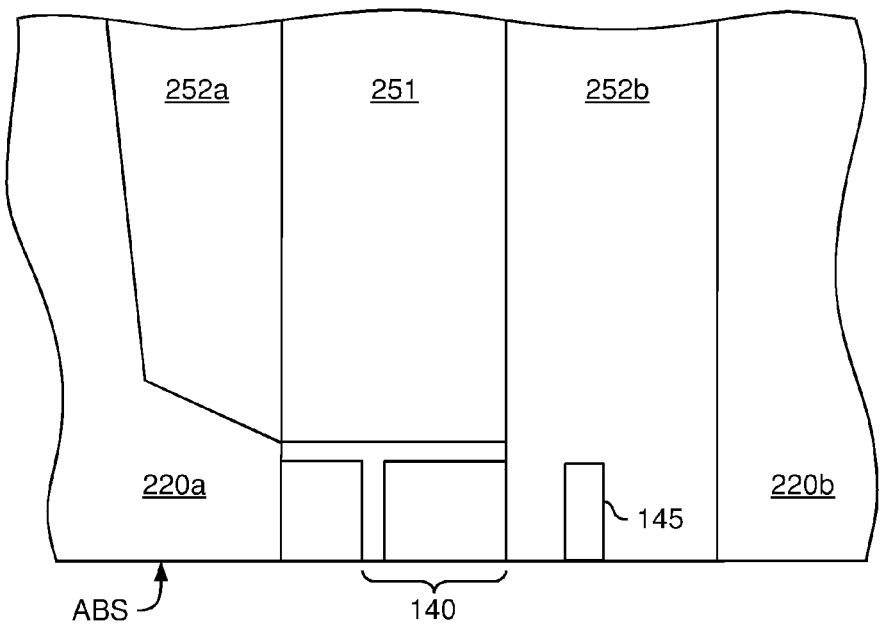

FIGS. 4A-B illustrate a cross-sectional schematic diagram of a TAR enabled head, according to embodiments of the invention. In FIG. 4A, the cladding 252b is shown with the sensor 145 embedded within. This electrically isolates the sensor 145, permitting a current to flow through the sensor to detect a change of resistance in the temperature sensor 145. Although not shown, the wire pad 260 may be embedded in the cladding 252b or in a separate dielectric material.

In one embodiment, the temperature sensor 145 is located at least 5 nm away from the ABS. In one embodiment, the sensor 145 is at least 15 nm away from the ABS. In another embodiment, the sensor 145 is at least 20 nm away from the ABS. In another embodiment, the sensor is at least 15 nm or 20 nm away from the ABS but no more than 60 nm away from the ABS. FIG. 4B illustrates, however, that the temperature sensor 145 may be located on the ABS.

Analytical Data

Figure 5:
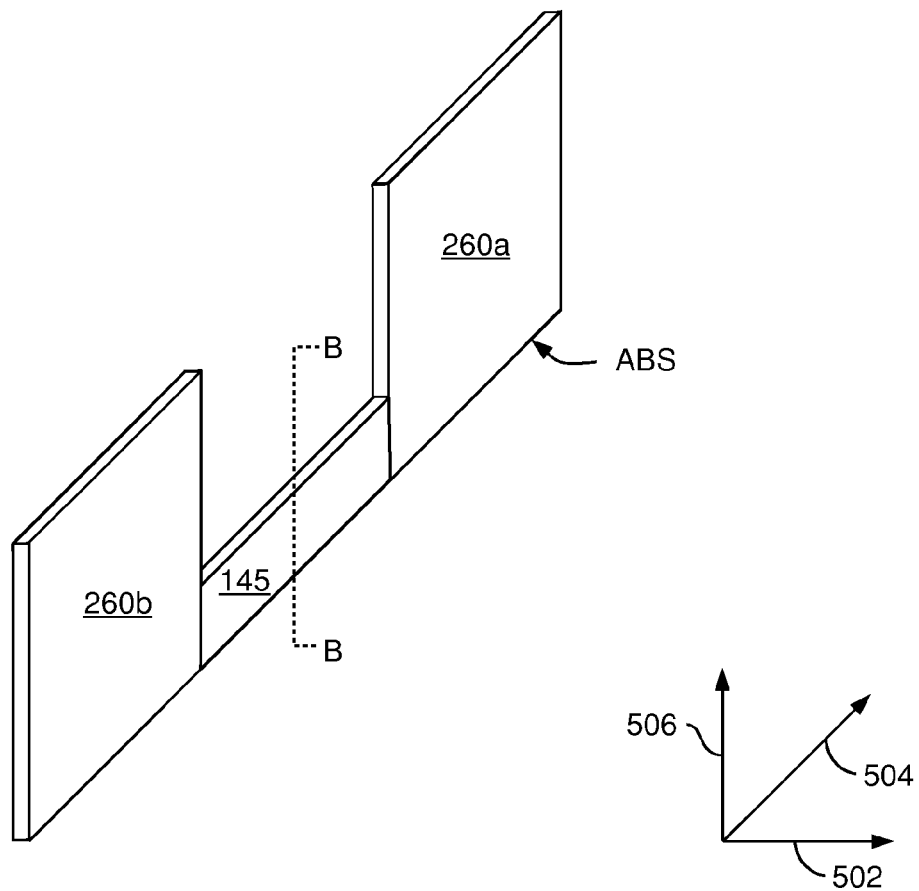
FIG. 5 is a schematic of a temperature sensor with wire pads, according to one embodiment of the invention.

FIG. 5 is a schematic of a temperature sensor with wire pads, according to one embodiment of the invention. As shown, the temperature sensor 145 is connected to two wire pads 260a,b on opposite ends. However, the wire pads 260a,b may be connected to the temperature sensor 145 in whatever manner that permits an electric current to flow through at least a portion of the temperature sensor 145 when a voltage potential is applied across the wire pads 260a,b. The dotted line labeled B-B illustrates the cross sectional view that is shown in FIG. 3 of the sensor 145 and wire pads 260a,b.

Moreover, as used herein, arrow 502 corresponds to the direction of the thickness, arrow 504 corresponds to the direction of the length, and arrow 506 corresponds to the direction of the height of the structures illustrate in the three-dimensional FIGS. 3 and 5.

Figure 6A:
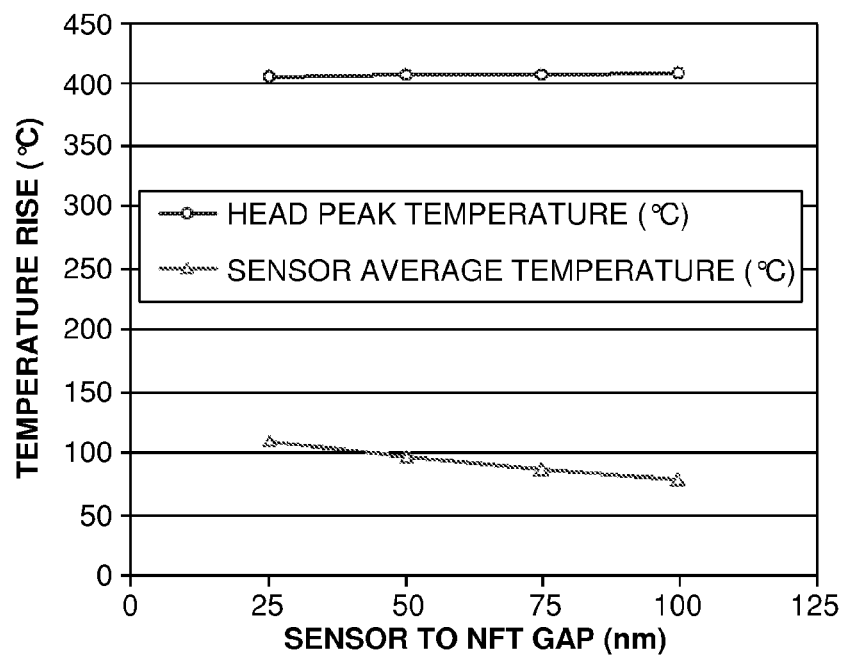
FIGS. 6A-B are graphs illustrating analytical data related to the gap between a near-field transducer and a temperature sensor, according to embodiments of the invention.
Figure 6B:
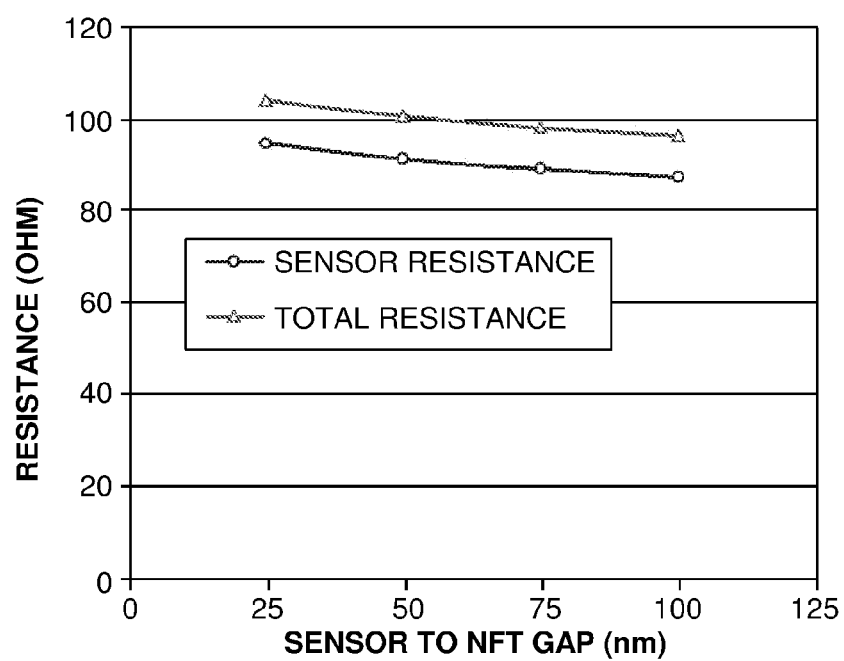

FIGS. 6A-B are graphs illustrating analytical data related to the gap between a near-field transducer and a temperature sensor, according to embodiments of the invention. Both FIGS. 6A and 6B illustrate temperature and electrical resistance according to the gap distance between the transducer 140 and the temperature sensor 145. The results were obtained with the thickness, height, and length of the sensor 145 set at 25 nm, 92 nm, and 0.8 µm respectively. The gap distance is shown in FIG. 3 by the dotted line labeled A-A and represents the distance between the two closest points (or planes) of the sensor 145 and the transducer 140 (e.g., the pole lip 315, dielectric 320, or the antenna 325).

In one embodiment, the sensor 145 and heat sink 305 may contact directly. However, in some cases, the sensor 145 and near-field transducer 140 may not directly contact. The metallic material of the temperature sensor 145 may interfere with the efficiency of the transducer 140 and hamper the function of the plasmonic device. Accordingly, in one embodiment, the sensor 145 and transducer 140 are separated by a non-magnetic, non-conductive material—e.g., cladding 252b—such that the temperature sensor 145 and transducer 140 do not directly contact. However, the farther the temperature sensor 145 is located from the transducer, the less sensitive it is to temperature fluctuations caused by the transducer 140.

FIG. 6A illustrates the negative effect of moving the temperature sensor 145 farther away from the transducer by increasing the gap distance. As the gap distance increases, the temperature of the sensor 145 decreases. Because the electrical resistance of the temperature sensor 145 corresponds to its temperature, the ability of the disk drive to correctly measure the temperature of the transducer 140 decreases as the gap distance increases.

In one embodiment, the gap distance between the near-field transducer 140 and the temperature sensor 145 is greater than 10 nm. In one embodiment, the gap distance is greater than 20 nm. In one embodiment, the gap distance is less than 100 nm. In one embodiment, the gap distance is between 10 and 50 nm. In one embodiment, the gap distance is between 15 and 35 nm. In one embodiment, the gap distance is between 20 and 30 nm, such as 25 nm.

FIG. 6B compares the total resistance of the wire pads 260 and the sensor 145 to the resistance of only the sensor 145 at varying gap distances.

Figure 7A:
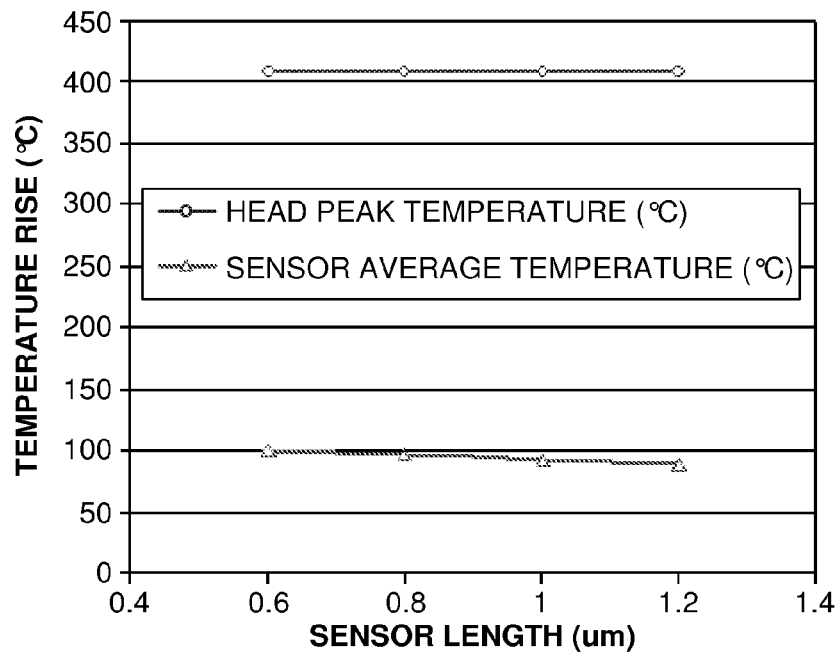
FIGS. 7A-B are graphs illustrating analytical data related to the length of a temperature sensor, according to embodiments of the invention.
Figure 7B:
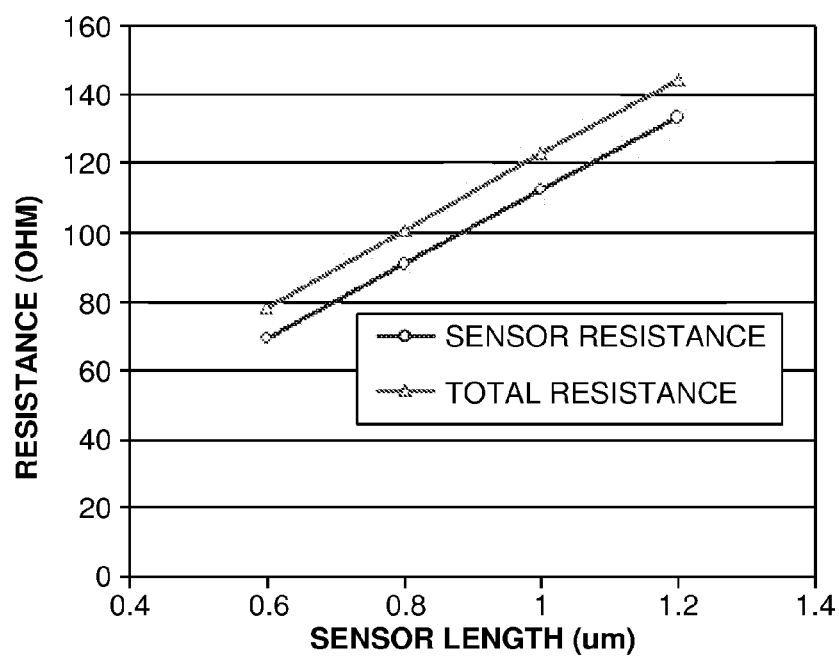

FIGS. 7A-B are graphs illustrating analytical data related to the length of the temperature sensor 145, according to embodiments of the invention. The results were obtained with a gap distance of 50 nm and the thickness and height of the sensor 145 set at 25 nm and at 92 nm, respectively. FIG. 7A illustrates that varying the length of the temperature sensor 145 has little affect on the ability of the sensor 145 to detect the temperature of the transducer 140. That is, the length may be between 200 nm to 1400 nm. FIG. 7B illustrates the possible resistances that may be achieved with the lengths shown. Accordingly, a circuit designer may choose the resistance (and corresponding length) that best matches the feedback circuit.

Figure 8A:
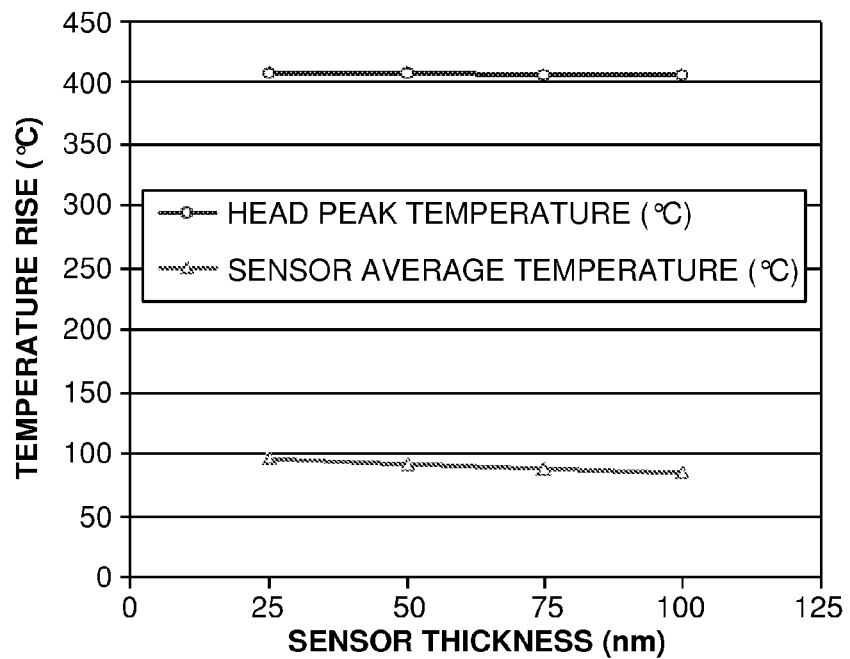
FIGS. 8A-B are graphs illustrating analytical data related to the thickness of a temperature sensor, according to embodiments of the invention.
Figure 8B:
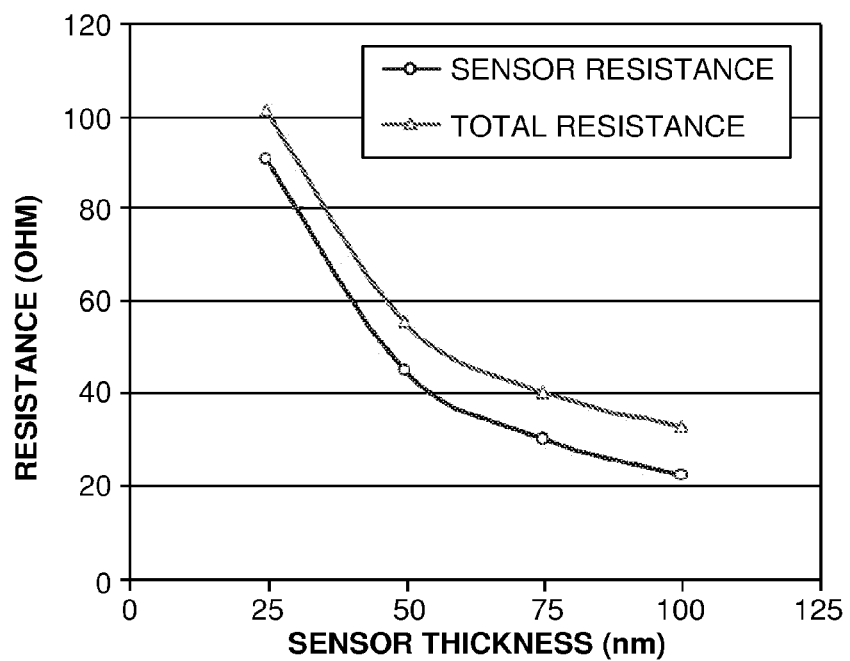

FIGS. 8A-B are graphs illustrating analytical data related to the thickness of a temperature sensor, according to embodiments of the invention. The measurements were taken with a gap distance of 50 nm and the length and height of the sensor 145 set at 0.8 µm and at 92 nm, respectively. As with length, FIG. 8A illustrates that varying the thickness of the temperature sensor 145 has little affect on the ability of the sensor 145 to detect the temperature of the transducer 140. FIG. 8B illustrates the possible resistances that may be achieved with the thicknesses shown.

In one embodiment, the thickness of the temperature sensor 145 is between 10 and 50 nm, the height is between 50 and 150 nm, and the length is between 0.7 and 0.9 µm. In another embodiment, the thickness of the temperature sensor 145 is between 15 and 35 nm, the height is between 80 and 110 nm, and the length is between 0.75 and 0.85 µm.

In one embodiment, the thickness of each of the wire pads 260 is between 10 and 50 nm, the height is between 500 and 1000 nm, and the length is between 300 and 600 nm. In another embodiment, the thickness of each of the wire pads 260 is between 20 and 40 nm, the height is between 600 and 800 nm, and the length is between 350 and 550 nm.

While the foregoing is directed to embodiments of the present invention, other and further embodiments of the invention may be devised without departing from the basic scope thereof, and the scope thereof is determined by the claims that follow.

What is claimed is:

1. A head of a disk drive, comprising:
an optical transducer configured to heat a magnetic media proximate to the head by focusing light emitted by a radiation source; and
a temperature sensor configured to thermally couple to the optical transducer, wherein the temperature sensor and the optical transducer are spaced apart by a first distance that is between 5 and 150 nm.

2. The head of claim 1, wherein the first distance between the temperature sensor and the optical transducer is between 10-100 nm.

3. The head of claim 1, further comprising:
a read pole configured to read data stored in the magnetic media; and
a write pole configured to store data to the magnetic media, wherein the temperature sensor is between the write pole and the read pole.

4. The head of claim 1, wherein the temperature sensor is recessed away from an air-bearing surface.

5. The head of claim 1, further comprising a read pole configured to read data stored in the magnetic media, wherein the temperature sensor is located between the optical transducer and the read pole.

6. The head of claim 5, further comprising a write pole and a return pole configured to store data in the magnetic media, wherein the optical transducer is located between the write and return poles, and wherein the temperature sensor is located between the optical transducer and the return pole.

7. The head of claim 1, further comprising at least one wire pad connected to the temperature sensor, wherein the head is configured to couple, via the at least one wire pad, to driver circuitry that controls the light emitted by the radiation source based on the electrical resistance of the temperature sensor.

8. The head of claim 7, wherein the at least one wire pad comprises a different material from a material of the temperature sensor, wherein the electrical resistance of the material of the at least one wire pad changes less based on temperature than a material of the temperature sensor.

9. The head of claim 7, wherein the temperature sensor comprises at least one of Ta, Pt, Au, Rh, NiFe, and combinations thereof and wherein the at least one wire pad comprises at least one of Ru, Cu, Ta, Cr and combinations thereof.

10. A method, comprising:
transmitting optical energy from a laser to an optical transducer located in a head of a disk drive, wherein the optical transducer focuses the optical energy onto magnetic media;
measuring the electrical resistance of a temperature sensor that is thermally coupled to the optical transducer, wherein the electrical resistance correlates to a temperature of the sensor, and wherein the temperature sensor and the optical transducer are spaced apart by a first distance that is between 5 and 150 nm; and
adjusting the optical energy transmitted by the laser based on the measured electrical resistance.

11. The method of claim 10, wherein the temperature sensor is located between 10-100 nm of the optical transducer.

12. The method of claim 10, further comprising:
a read pole configured to read data stored in the magnetic media; and
a write pole configured to store data to the magnetic media, wherein the temperature sensor is between the write pole and the read pole.

13. The method of claim 10, wherein the temperature sensor is recessed away from an air-bearing surface.

14. The method of claim 10, further comprising a read pole configured to read data stored in the magnetic media, wherein the temperature sensor is located between the optical transducer and the read pole.

15. The method of claim 14, further comprising a write pole and a return pole configured to store data in the magnetic media, wherein the optical transducer is located between the write and return poles, and wherein the temperature sensor is located between the optical transducer and the return pole.

16. The method of claim 10, further comprising at least one wire pad connected to the temperature sensor.

17. The method of claim 16, wherein the at least one wire pad comprises a different material from a material of the temperature sensor, wherein the electrical resistance of the material of the at least one wire pad changes less based on temperature than a material of the temperature sensor.

18. The method of claim 16, wherein the temperature sensor comprises at least one of Ta, Pt, Au, Rh, NiFe, and combinations thereof and wherein the at least one wire pad comprises at least one of Ru, Cu, Ta, Cr and combinations thereof.

* * * * *

UNITED STATES PATENT AND TRADEMARK OFFICE
CERTIFICATE OF CORRECTION

PATENT NO. : 8,451,696 B2  
APPLICATION NO. : 13/285769  
DATED : May 28, 2013  
INVENTOR(S) : Huang et al.

Page 1 of 1

It is certified that error appears in the above-identified patent and that said Letters Patent is hereby corrected as shown below:

On the Title Page, Item [73]:

Please delete "San Jose, CA (US)" and insert --Amsterdam (NL)-- therefor.

Signed and Sealed this
Twenty-fifth Day of February, 2014

Michelle K. Lee
*Deputy Director of the United States Patent and Trademark Office*